United States Patent
Khudyakov et al.

(10) Patent No.: US 9,469,782 B2
(45) Date of Patent: Oct. 18, 2016

(54) CATALYSTS FOR THERMAL CURE SILICONE RELEASE COATINGS

(71) Applicant: CPFilms Inc., Fieldale, VA (US)

(72) Inventors: Igor V. Khudyakov, Hickory, NC (US); Michael Hawkins, Martinsville, VA (US)

(73) Assignee: CPFilms Inc., Fieldale, VA (US)

( * ) Notice: Subject to any disclaimer, the term of this patent is extended or adjusted under 35 U.S.C. 154(b) by 60 days.

(21) Appl. No.: 13/689,996

(22) Filed: Nov. 30, 2012

(65) Prior Publication Data

US 2013/0142949 A1    Jun. 6, 2013

Related U.S. Application Data

(63) Continuation of application No. PCT/US2012/066858, filed on Nov. 28, 2012.

(60) Provisional application No. 61/566,122, filed on Dec. 2, 2011.

(51) Int. Cl.
*C09D 183/04* (2006.01)
*B05D 1/00* (2006.01)

(52) U.S. Cl.
CPC .............. *C09D 183/04* (2013.01); *B05D 1/002* (2013.01); *B05D 2252/02* (2013.01)

(58) Field of Classification Search
CPC .................................................. C09D 183/04
USPC .................................. 427/177; 524/860, 861
See application file for complete search history.

(56) References Cited

U.S. PATENT DOCUMENTS

| | | | |
|---|---|---|---|
| 3,527,659 A | 9/1970 | Keil et al. | |
| 3,567,493 A * | 3/1971 | Wessel et al. | 427/387 |
| 3,579,469 A | 5/1971 | Grenoble | |
| 3,776,977 A * | 12/1973 | Chadha | 525/100 |
| 4,341,842 A * | 7/1982 | Lampe | 428/450 |
| 4,761,443 A * | 8/1988 | Lopes | 524/110 |
| 5,513,040 A | 4/1996 | Yang | |
| 5,670,441 A | 9/1997 | Foedde et al. | |
| 5,904,988 A | 5/1999 | Stein et al. | |
| 6,187,447 B1 | 2/2001 | Stein et al. | |
| 6,403,105 B1 * | 6/2002 | Stein | 424/400 |
| 7,846,550 B2 | 12/2010 | Ooms et al. | |
| 2001/0003763 A1 * | 6/2001 | Nishimura et al. | 524/490 |
| 2006/0128919 A1 * | 6/2006 | Okamoto et al. | 528/25 |
| 2006/0204768 A1 | 9/2006 | King et al. | |
| 2007/0191541 A1 | 8/2007 | Guennouni et al. | |

FOREIGN PATENT DOCUMENTS

| | | |
|---|---|---|
| DE | 15 46 410 A1 | 8/1965 |
| DE | 21 35 673 A1 | 7/1971 |
| DE | 27 48 406 A1 | 10/1977 |
| EP | 2 584 013 A1 | 4/2013 |
| WO | WO 2013/106193 A1 | 7/2013 |

OTHER PUBLICATIONS

PCT International Search Report and Written Opinion dated Mar. 28, 2013 for International Application No. PCT/US2012/066858.
J.E. Mark, Allcock, R. West, *Inorganic Polymers*, Oxford University Press, New York, 2005, chapter 4.3.
http://adhesivesmag.com/Articles/Feature Article/BNP GUID 9-5-2006 A 10000000000001084746.
Burford, Neil, "Bismuth", C&EN, Sep. 8, 2003, p. 156, Dalhousie University.
Kricheldorf, Hans et al., "Telechelic polyesters of ethane diol and adipic or sebacic by means of bismuth carboxylates as non-toxic catalysts", ScienceDirect, Nov. 28, 2005, pp. 11219-11224, vol. 45, Issue 25, Germany.
Supplementary European Search Report dated Jun. 15, 2015 for European Patent Application No. 12852830.4.
G. Odian, Principles of Polymerization, pp. 44-45 and 132-134 (4th ed. 2004), John Wiley & Sons, Inc. Hoboken, NJ.

\* cited by examiner

*Primary Examiner* — Dah-Wei D Yuan
*Assistant Examiner* — Jose Hernandez-Diaz
(74) *Attorney, Agent, or Firm* — John P. Foryt

(57) ABSTRACT

An environmentally acceptable catalyst, coating system, and methods for thermal cure silicone release coatings that utilize bismuth ("Bi") catalyst to retain properties of tin ("Sn")-catalyzed systems but do not have the toxicity and environmental hazards associated therewith. The coating systems and methods also provide a laminate that shows reduced orange peel distortion over time compared with tin ("Sn")-catalyzed systems and methods.

18 Claims, 5 Drawing Sheets

CATALYSTS FOR THERMAL CURE SILICONE RELEASE COATINGS

CROSS REFERENCE TO RELATED APPLICATION(S)

This application is a Continuation of International Application Serial No. PCT/US12/66858, filed Nov. 28, 2012 and currently pending, and also claims the benefit of U.S. Provisional Patent Application Ser. No. 61/566,122, filed Dec. 2, 2011. The entire disclosure of both documents is incorporated herein by reference.

BACKGROUND OF THE INVENTION

1. Field of the Invention

This disclosure is related to the field of silicone release coating technology. Specifically using catalysts containing bismuth (bismuth ("Bi") catalysts) for thermal curing of silicone release coatings.

2. Description of Related Art

Release coatings are generally used to prevent things from sticking together. This simple statement and function encompasses a broad base of technology and a large global industry involving both silicone and non-silicone materials. A very common release coating in the industry utilizes thermal curing based generally on the following reaction:

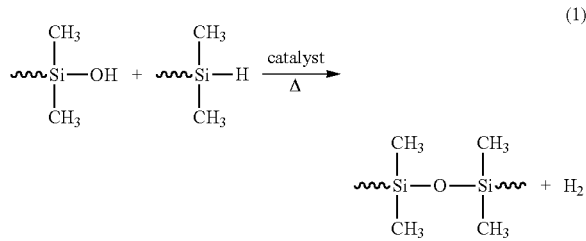

In the above reaction, a high molecular weight silanol prepolymer (such as α,ω-dihydroxysilanol of polydimethylsiloxane (PDMS) structure which has a molecular weight of about 5 kg/mol) reacts with a lower molecular weight silane (such as one with a molecular weight of about 2 kg/mol). The high functionality of the silane provides for the crosslinking of the silanol and the resultant curing of the coating through the formation of an infinite 3D polymeric network. The reaction proceeds slowly at room temperature, but dramatically accelerates in the presence of a catalyst and under elevated temperatures. The reaction is dehydrogenative condensation which is accompanied by evolution of dihydrogen.

The first thermal-cure silicone release coating systems were commercialized in the 1950s and used tin based materials as the catalyst. Since that time, several technological evolutions have occurred including solvent-based platinum ("Pt")-catalyzed thermal curing systems in the 1970s, followed by solventless platinum ("Pt")- and rhodium ("Rh")-catalyzed systems, radiation curing systems and low-temperature curing systems. It should be recognized that terminology in this area can be a bit confusing. When one refers to a platinum ("Pt") catalyzed curing system, or platinum ("Pt") catalyst, the catalyst generally does not comprise only platinum metal, instead, it generally means that a compound including that metal is used. This terminology will be used throughout this disclosure, and thus any phrase indicating that the curing system is metal ("Me")-catalyzed or there is a metal ("Me") catalyst should be taken to mean that the catalyst is a compound including the metal "Me", not necessarily the metal itself.

Despite these changes in thermal cure solvent-based release coating systems, tin ("Sn") catalyst cure systems are still heavily utilized in release coatings. In these reactions, organo-tin compounds, such as dibutyltin diacetate, in the presence of moisture, catalyze the reaction. Tin ("Sn")-catalyzed condensation cure systems are still generally well used in the art because of their inherent properties. First, the rates of tin ("Sn")-catalyzed condensation cure systems are slow at room temperatures, becoming faster at higher temperatures. Further, many commonly used manufacturing systems in the art have anchorage and pot life requirements, for which the slow cure times of tin ("Sn")-catalyzed systems are ideal. In certain cases low-temperature cure is often desirable because it reduces energy costs and facilitates the coating of temperature-sensitive film substrates.

Second, tin ("Sn")-catalyzed silicone release coating systems are more cost effective. Tin ("Sn")-catalyzed systems are relatively inexpensive, especially when compared to platinum ("Pt") or rhodium ("Rh")-catalyzed systems, which are extremely expensive. Third, tin ("Sn")-catalyzed silicone release coating systems are extremely robust. For example, tin ("Sn")-catalyzed systems are resistant to substrate inhibition, thus allowing for a wider choice of possible substrates. Finally, there is generally little adhesive interaction with tin ("Sn")-catalyzed systems which can be valuable in applications involving silicone laminates. Furthermore, release coatings are usually solvent-borne systems which allow coatings as thin as about 100 nm on a substrate. In sum, tin ("Sn")-catalyzed silicone release coating systems provide for a well-established, reliable, low-cost coating system that can be coated onto a wide selection of substrates. For this reason, tin ("Sn")-catalyzed silicone release coating systems are preferred in many areas of the art.

However, despite these advantages, due to environmental concerns and regulatory restrictions there has been pressure to move away from tin ("Sn")-catalyzed systems. While some in the art have adjusted to these new environmental concerns and regulatory pressure by moving towards platinum ("Pt")- or rhodium ("Rh")-catalyzed systems or solventless, emulsion-based and UV-cure technologies, none of these systems have the same inherent advantages of tin ("Sn")-catalyzed silicone release coating systems. Thus, these alternative systems generally do not meet customer demands for a catalyzed release coating that functions similarly to a tin ("Sn")-catalyzed release coating. Further, due to increased costs of alternative catalysts, among other factors, these systems are not as cost-effective for producers and manufacturers in the art as the tin ("Sn")-catalyzed systems.

Because of these cost considerations and behavioral differences in solventless, emulsion-based, platinum ("Pt")- or rhodium ("Rh")-catalyzed systems and UV-cure technologies, there is a very high demand in the industry for a catalyst for silicone release coating systems that is cost effective and has the same behavioral characteristics as known for tin ("Sn")-catalyzed systems. Stated differently, a replacement catalyst is needed that can be used instead of catalysts comprising tin compounds in silicone release coating systems that will retain all of the advantageous properties of tin ("Sn")-catalyzed systems without any of the toxicity hazards associated with the tin ("Sn")-catalyzed systems.

SUMMARY

An environmentally acceptable catalyst, coating system, and methods for thermal cure silicone release coatings that utilize bismuth ("Bi") catalyst to retain properties of tin ("Sn")-catalyzed systems but do not have the toxicity and environmental hazards associated therewith. The coating systems and methods also provide a laminate that shows reduced orange peel distortion over time compared with tin ("Sn")-catalyzed systems and methods.

There are described herein, among other things, a method of forming a silicone release coating according to the following reaction:

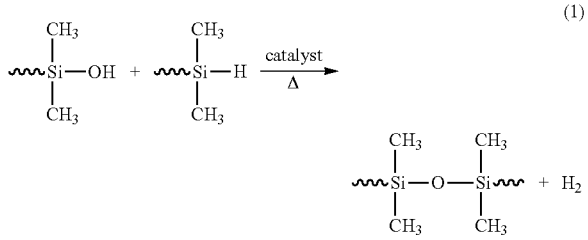

utilizing a bismuth ("Bi") catalyst in the thermal curing.

There is also described herein, a method of forming a silicone release coating comprising: mixing a solvent, a silanol, silane, and a bismuth ("Bi") catalyst to form a mixture; and thermally curing the mixture to form a silicone release coating. The method further comprises adding a reactive siloxane polymer to the mixture prior to thermal curing.

In embodiments of the method, the method may further comprise one or more of: adding a silanol pre-polymer to the mixture prior to thermal curing; adding a pre-polymer crosslinker, such as, but not limited to, a silane with functionality, $f_{Si-H}$, of 2 or higher to the mixture prior to thermal curing; adding amino silicone to the mixture prior to thermal curing; adding a control release additive, such as, but not limited to, a silicone resin, for example, an M resin or MQ resin, to the mixture prior to thermal curing; or adding an inhibitor to the mixture prior to thermal curing.

In an embodiment of the method, the bismuth ("Bi") catalyst is selected from the group consisting of: a bismuth-zinc neodecanoate, a bismuth 2-ethylhexanoate, a metal carboxylate of bismuth and zinc, and a metal carboxylate of bismuth and zirconium.

In an embodiment of the method, the bismuth ("Bi") catalyst comprises bismuth in combination with at least one metal selected from the group consisting of: zinc, zirconium, titanium, palladium, and aluminum or the bismuth ("Bi") catalyst comprises a bismuth salt or bismuth chelate.

There is also described herein a method of storing a rolled film, the method comprising: mixing a solvent, a silanol, a silane, and a catalyst including bismuth to form a mixture; coating a liner with the mixture; thermally curing the mixture to form a silicone release coating on the liner; applying the silicone release coating to a film; rolling at least 1000 feet of the film and liner in a bulk roll; and retaining the film and liner in the bulk roll for more than two days, in some embodiments at least 5 days; wherein, after the retaining, the film has less orange peel distortion than if the silicone release coating had been formed with a catalyst including tin.

DETAILED DESCRIPTION OF PREFERRED EMBODIMENTS

Figure 1:
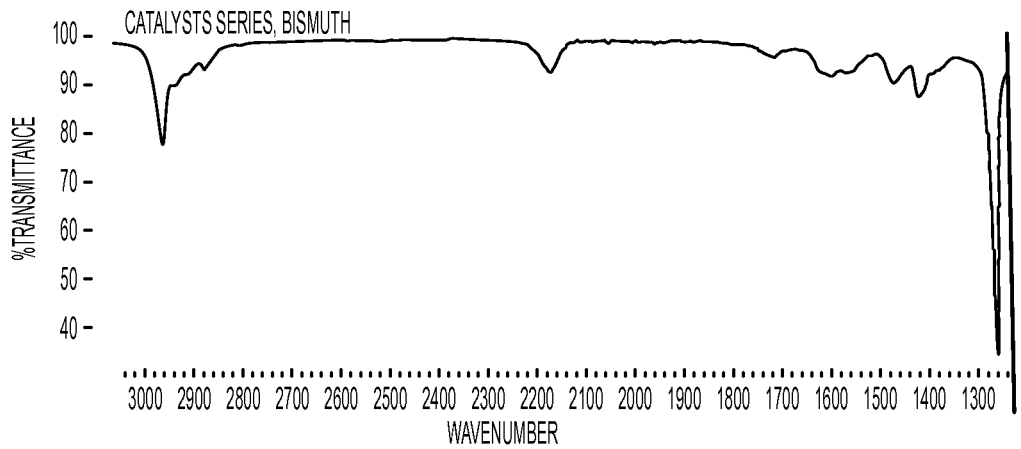
FIGS. 1-3 demonstrate the aging of the liquid formulations for silicone release liners in the presence of bismuth ("Bi") catalysts. In this case, a bismuth/zinc neodecanoate mixture, as further discussed below, was used.

Described herein is an environmentally acceptable catalyst and/or coating system for thermal cure silicone release coatings that retains the inherent advantageous properties associated with tin ("Sn")-catalyzed silicone release coatings but does not have the toxicity and environmental hazards associated with the tin-based systems. As discussed above, the terminology used throughout this disclosure provides that any phrase indicating that the curing system is metal ("Me")-catalyzed or there is a metal ("Me") catalyst should be taken to mean that the catalyst is a compound including the metal "Me", not necessarily the metal itself. Thus, for example, a "tin ("Sn")-catalyzed silicone release coating" is any silicone release coating formed utilizing a compound including elemental tin as a catalyst and a "bismuth ("Bi") catalyst" is any compound including elemental bismuth which can be used as a catalyst.

Unexpectedly, it has been found that bismuth compounds catalyze the crosslinking of condensation-type silicone release coatings with similar rates and resultant properties as tin compounds. Experimentation revealed that the tin ("Sn") catalyst in silicone release coatings can be replaced with a bismuth ("Bi") catalyst at the same or lower atomic concentrations (on a mole-to-mole basis of the metal content) to accelerate crosslinking and produce the same favorable inherent properties without the hazards and toxicity associated with tin ("Sn") catalysts. Although these bismuth ("Bi") catalysts can be used in any silicone release coatings, the coatings will generally include, in addition to the catalyst: (1) a reactive siloxane polymer (referred to herein as "polysiloxane"), or, alternatively, a silanol pre-polymer; (2) a pre-polymer crosslinker (referred to herein as "cross-linking agent"); (3) an optional control release additive; and (4) other optional additives (including, for example, an inhibitor).

In particular, in one embodiment, it was found that a bismuth ("Bi")-catalyzed system, such as one with a bismuth/zinc catalyst is four times more efficient than a conventional tin ("Sn") catalyst on a mole-to-mole basis of the metal content and produced the same inherent performance properties as systems that were tin ("Sn")-catalyzed. As such, a release liner with the same properties can be obtained if about a quarter of the amount on a molar basis of the bismuth ("Bi") catalyst is used in place of a traditional tin ("Sn") catalyst in the same coating formulation.

The bismuth ("Bi") catalysts are optimally used in an amount of about 2 to 14 wt % based on the weight of the polysiloxane in the coating formulation. The resultant release liner coating formulations used for the examples of the application contained the following typical components in the following ranges (all amounts are in weight %): Catalyst: about 1.6-2.8; Polysiloxane or Silanol Prepolymer: about 56-92; Cross-Linking Agent: about 0.89-2.00; Accelerator/Inhibitor: about 2.15-3.95; and an optional Control Release Additive: about 0-40. The particular components are discussed more fully below.

Solvent may be also added as necessary to the above formulations, as determined by one skilled in the art, to provide a coating that will meet the specific requirements for thickness and other properties. The amount of solvent depends on various factors, including the coating method and particular coating equipment and process variables used. In the formulations tested, the solvent used was a mixture of heptane and toluene in a weight ratio of about 1.7 to 2.05. The solvent mixture was used in an amount of about 17 to 28 times the combined weight of the formulation components. Other solvents, and the ratios and amounts thereof, could be utilized as would be recognized by one of ordinary skill in the art.

This disclosure proceeds with a more thorough discussion of the above-noted components of the silicone release liner composition, followed by some of the findings associated with experimentation of the compositions disclosed herein.

Polysiloxanes are well known in the art of silicone release liners. The polysiloxane, when crosslinked (in the presence of the catalyst), provides the base composition of the release liner coatings. Any polysiloxane known to be used in silicone release liners can be utilized in the composition disclosed herein, but the polysiloxane will generally contain groups which can undergo condensation reactions, with the groups being condensable with one another or with other reactive (i.e., hydrolysable) leaving groups like alkoxy, aryloxy, alkylcarboxy, amido and amino groups attached to silicon and the like. The preferred groups are hydroxyl functional groups at the ends and/or along the polymer chain of the polysiloxane. More specifically, the composition disclosed herein is preferably comprised of hydroxyl-terminating (i.e., SiOH) polydimethylsiloxanes. Examples of such polysiloxanes are disclosed, for example, in U.S. Pat. Nos. 3,527,659, 3,579,469, and 7,846,550, DE 15 46 410, DE 21 35 673, and DE 27 48 406, the entire disclosures of which are incorporated herein by reference.

Alternatively, a silanol pre-polymer can be utilized in place of the polysiloxane. The silanol pre-polymer will have functionality, $f_{Si-OH}$, of greater than or equal to 2. The main backbone of the silanol can be, for example, diphenylsiloxane or methylphenylsiloxane. Besides phenyl and methyl side groups the silanols may have n-, iso- or tertiary alkyl groups ($C_2$-$C_{37}$), cyclic alkyl groups, arylsubstituted alkyl groups, carboxy groups, substituents with N, O, S or F-atoms and the like. The silanol may be a copolymer or a mixture of silanols. Instead of silanols one can use silicone prepolymers with such terminal hydrolysable groups as aryloxy, alkoxy, alkylcarboxy, amido, and amino groups.

The polysiloxane bearing Si—OH groups or the silicone pre-polymer (silonol) is generally cross-linked with a silane in the formation of the release coating. The silanes can have the same or similar backbones and substituents as those described above for silanols. It is desirable to have silanes of lower molecular weight than the molecular weight of silanols and to have some excess Si—H groups as compared to Si—OH groups in the reaction mixture.

As noted above, the cross-linking agent, as the name implies, crosslinks the polysiloxane or the silanol prepolymer to a cured surface layer with release properties. The crosslinking agents are generally silanes and will generally have the same or similar backbones and substituents as those described above for silanols and polysiloxanes. It is important, however, that the functionality, $f_{Si-H}$, of silane is 2 or higher. Further, it is preferred to have silanes of lower molecular weight than the molecular weight of the silanols or polysiloxanes. This ensures that there are excess Si—H groups as compared to Si—OH groups in the reaction mixture.

Amino silicone can also be added in the composition. Amino silicone may have different structures outlined above for silanol and silane. Amino silicone has at least one primary, secondary, tertiary, etc. amino group bound to the backbone.

Control release additives such as silicone resins of the general formula $R_n SiO_{(4-n)/2}$ where n is 0 to 4 and where R is generally a hydrocarbon, such as methyl (—$CH_3$) or phenyl (—$C_6H_5$) may be used can be used in some embodiments. A polymer having repeat units of [—$SiR_2O$—] would be referred to as a polysiloxane, and if R group was a methyl, it would specifically be referred to as a poly(dimethylsiloxane). These resins are generally described using standard silicone M, D, T, Q nomenclature to describe silicone resins or siloxanes, where M, D, T and Q are described as follows: "M" designates the monofunctional unit, $R_3SiO_{1/2}$ where the R groups may be the same or different; "D" designates the difunctional unit, $R_2SiO_{2/2}$, where the R groups may be the same or different; "T" designates the trifunctional unit, $RSiO_{3/2}$ and "Q" designates the quadrifunctional unit, $SiO_{4/2}$. The dimer $R_3SiOSiR_3$ (or $(CH_3)_3SiO(CH_3)_3$ if the R groups are methyl) would be referred to as "MM" or "$M_2$" resin. The oligomer $R_3Si[OSiR_2]_xOSiR_3$ (or $(CH_3)_3Si[OSi(CH_3)_2]_xOSi(CH_3)_3$ if the R groups are methyl) would be referred to as "$MD_xM$" resin, where "x" represents the number of "D" units in the chain. The cyclic trimer $[SiR_2O]_3$ (or $[Si(CH_3)_2O]_3$ if the R groups are methyl) would be referred to as "$D_3$" resin. The various fragments (M, D, T and Q) are bonded together in various combinations via alternating [—Si—O—Si—O—Si—] linkages to make linear or non-linear siloxane resins. In an embodiment, an MQ resin (which comprises both M units and Q units or molecular fragments in various ratios of M to Q, depending on the desired properties) is used as the control release additive. Such additives can also be utilized to increase the release force, if necessary and/or desired, of the release liner. In this regard, control release additives are not necessary, but, for some applications, a wide range of release levels may be desired. For additional detail on silicone resins useable as control release additives see J. E. Mark, H. R. Allcock, R. West, *Inorganic Polymers*, Oxford University Press, new York, 2005, chapter 4.3, the entire disclosure of which is herein incorporated by reference.

Finally, it has now been discovered that the base reaction between silanol and silane can be catalyzed with a compound containing bismuth (a bismuth ("Bi") catalyst). Generally, any bismuth compound, or mixtures containing bismuth compounds, known to those of ordinary skill in the art can be used as a bismuth ("Bi") catalytic agent in silicone release coatings as disclosed herein. More specifically, contemplated bismuth compounds are generally carboxylic salts of bismuth (III) and include bismuth in combination with metals like zinc, zirconium, titanium, palladium, and/or aluminum and salts or chelates of bismuth, preferably conveniently soluble in non-polar organic media. Some of these compounds have an excess of the corresponding acid to diminish the hydrolysis of bismuth (III). Examples of suitable bismuth compounds include, but are not limited to: a bismuth-zinc neodecanoate mixture with about 8 wt % bismuth (e.g., BiCAT® 8); bismuth 2-ethylhexanoate mixture with about 28 wt % bismuth (e.g., BiCAT® 8210); bismuth neodecanoate mixture with a low concentration of acid and about 28 wt % bismuth (e.g., BiCAT® 8124); and metal carboxylates of bismuth, zinc, and zirconium, with less than about 18 wt % bismuth (e.g., BiCAT® 3184). All the BiCAT® brand products are available from Shepard Chemical Company. Alternatively, the following bismuth compounds: bismuth carboxylate with about 18 to 20 wt % bismuth (e.g., K-KAT® XC-B221 and K-KAT® XK-601); and bismuth carboxylate with no extra acid and about 31 wt % bismuth (e.g., K-KAT® XK-628) can be used. All of these K-KAT® brand compounds are available from King Chemical Company. It is believed that bismuth acetate with no extra acid and about 54 wt % bismuth would also work, however, it is generally insoluble in the components of the reaction and would likely require an additional agent to provide for appropriate mixing.

Surprisingly, experimentation based on the composition disclosed herein revealed that the peel force necessary to peel off test tape from release coatings (also known as a release force and discussed more fully below) in bismuth ("Bi")-catalyzed silicone release coatings was statistically the same peel force necessary to peel off test tape from tin ("Sn")-catalyzed silicone release coatings. This was true even when the same base coating formulations were used with different control release additive (MQ resin) concentrations. While peel release values ("PRV") did sometimes change between catalysts (particularly with altering concentrations), the numbers were generally sufficiently similar, and other properties were generally similar, to allow for bismuth ("Bi")-catalyzed coating systems to be used as a substitute for tin ("Sn")-catalyzed coating systems.

For example, in a series of experiments, peel release values of a variety of release liners prepared with either a tin ("Sn")-catalyzed system or a bismuth ("Bi")-catalyzed system, such as a bismuth/zinc catalyst, were compared to each other. The release liners prepared with a bismuth ("Bi") catalyst had an elemental bismuth atomic concentration of about 25% of the elemental tin present in a tin ("Sn") catalyst. The only difference between the coating formulations was the amount and type of elemental metal (i.e., elemental tin or elemental bismuth). The same PRV values were obtained for each release liner tested irrespective of the elemental metal and the specific metal compound utilized so long as appropriate amounts of the specific catalyst were used. Stated differently, with appropriate selection of the amount of catalyst, there was no substantial statistical difference in the PRV of any of the release liners tested, regardless of which specific elemental metal or catalyst compound was utilized (i.e., either tin or bismuth).

In one experiment with a liner manufactured with a tin ("Sn")-catalyzed system, a peel force of 27.4 g-force/in was attained. When the tin ("Sn") catalyst was replaced by the bismuth ("Bi") catalyst (specifically bismuth/zinc (e.g., BiCAT® 8) or bismuth (BiCAT® 8210)) in the same release liner coating formulation in a concentration using bismuth ("Bi") catalyst in an amount of about 75 wt. % of the amount of the tin ("Sn") catalyst, peel forces of about 25 and about 23 g-force/in respectively were obtained. In sum, the same (statistically) PRV values were obtained for each release liner formulation that was tested irrespective of whether catalysts comprising elemental bismuth or tin were used. Substituting bismuth ("Bi") catalysts for the traditional tin ("Sn") catalysts provided a release liner that was more environmentally friendly without sacrificing the advantageous physical and mechanical properties obtained by tin ("Sn")-catalyzed silicone release coatings.

In addition, the degree of cure measured by extraction (as discussed more fully below) from a coated cured film kept in n-heptane was statistically the same for both tin ("Sn")- and bismuth ("Bi")-catalyzed silicone release coatings in each of the prepared and tested release liners. For example, one silicone coated release liner which was tested with both tin ("Sn")-catalyzed and bismuth ("Bi")-catalyzed systems had about 16% extractables with a tin ("Sn") catalyst and about 10% extractables with a bismuth ("Bi") catalyst. Thus, experimentation revealed that bismuth ("Bi") catalysts are unexpectedly more efficient catalysts than tin ("Sn") catalysts and can be utilized at the same or lower concentrations in silicone release coatings without sacrificing or altering the performance properties traditionally associated with tin ("Sn")-catalyzed systems.

This discovery of the analogous properties of bismuth ("Bi") catalysts was even more surprising given that bismuth ("Bi") catalysts succeeded where other catalysts, with compounds having similar structures to tin ("Sn") catalysts, had failed. Comparative experiments were performed using other catalysts with similar structures to tin carboxylates. When substituted for tin ("Sn") catalysts, these other catalysts did not accelerate crosslinking at room temperature. Other catalysts tested included zinc ("Zn") catalysts (zinc stearate and zinc neodecanoate), iron ("Fe") catalyst (iron acetate), nickel ("Ni") catalyst (nickel octanoate hydrate), and rhodium ("Rh") catalyst (rhodium octanoate dimer). All of these other catalysts were tested in the same base coating formulations, and they all demonstrated poor coating performance (as tested by smoothing a finger or thumb over the coating and visually observing whether the coating smeared or smudged, as discussed more fully below). All of the catalysts were tested at the same level, and all except the zinc neodecanoate were partially soluble. The iron ("Fe") catalysts, nickel ("Ni") catalysts, and rhodium ("Rh") catalysts, when used, made colored solutions, providing evidence that at least some catalyst was in solution. While there was some catalytic activity from the zinc ("Zn")-catalyzed systems, the zinc ("Zn")-catalyzed coatings were not as robust as the bismuth ("Bi")-catalyzed (e.g. bismuth/zinc) systems. The nickel ("Ni") catalysts and iron ("Fe") catalysts, when tested in this application, did not demonstrate any catalytic properties (i.e. no curing).

Figure 2:
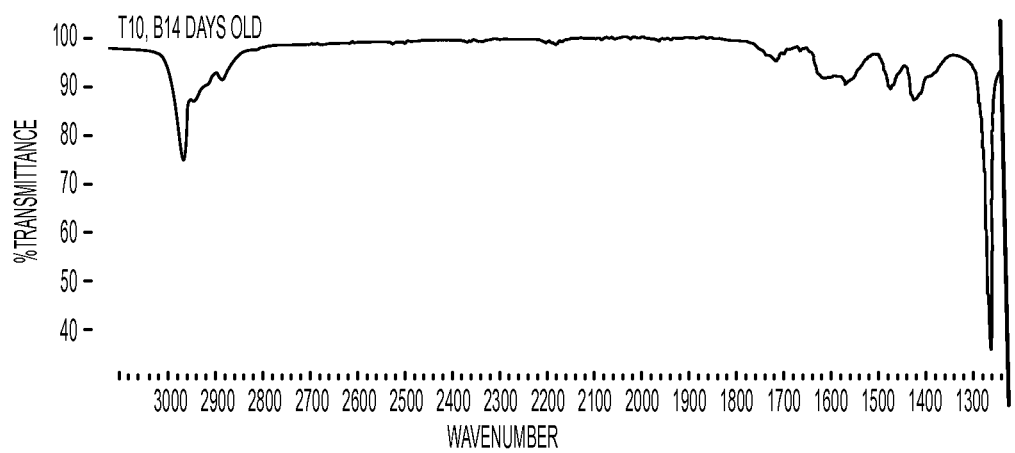
Figure 3:
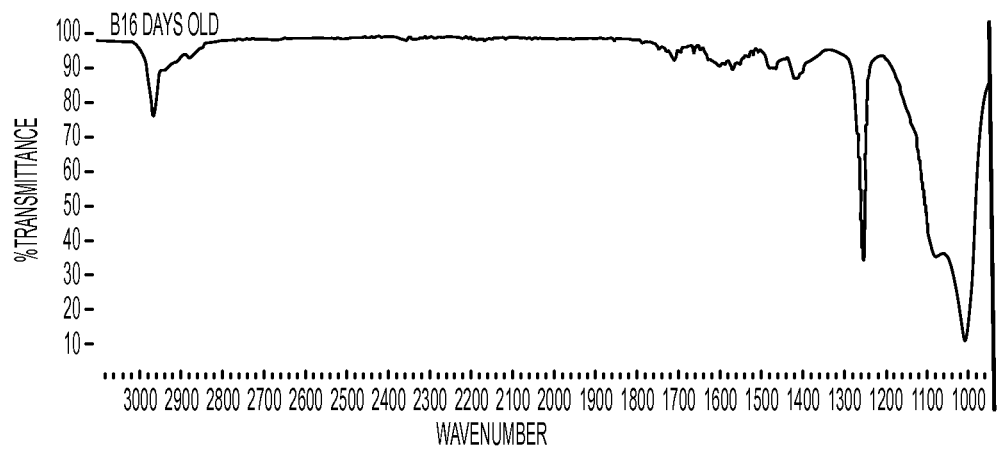

This poor efficiency of the iron ("Fe")-catalyzed, nickel ("Ni")-catalyzed, and rhodium ("Rh")-catalyzed systems with regard to acceleration of crosslinking is demonstrated in FIGS. 1-10. FIGS. 1-3 are three IR spectra which demonstrate the aging of a liquid silicone formulation used for release liners consisting of commercially available components and having a bismuth/zinc compound used instead of an elemental tin compound in the catalyst. The spectrum in FIG. 1 was taken promptly after preparation of the bismuth ("Bi")-catalyzed formulation, and it demonstrates a relatively weak but measurable absorption band at 2160 cm$^{-1}$ due to Si—H vibrations of the silane curing agent. As demonstrated in FIG. 2, taken after 4 days of storage at room temperature, the band decreases in intensity. Further, as seen in FIG. 3, after 6 days of storage at room temperature the band disappears completely. This was originally taken to signify that crosslinking has occurred and the silane curing agent has been used up. However, it has been determined that as the coating formulations include an excess of silane curing agent, it should not be entirely consumed in the reaction. However, a catalyst containing bismuth apparently reacts with raw silane curing agent to eliminate the peak and indicate curing. The absence of the peak is therefore indicative (but does not necessarily prove) that the material has cured.

Figure 4:
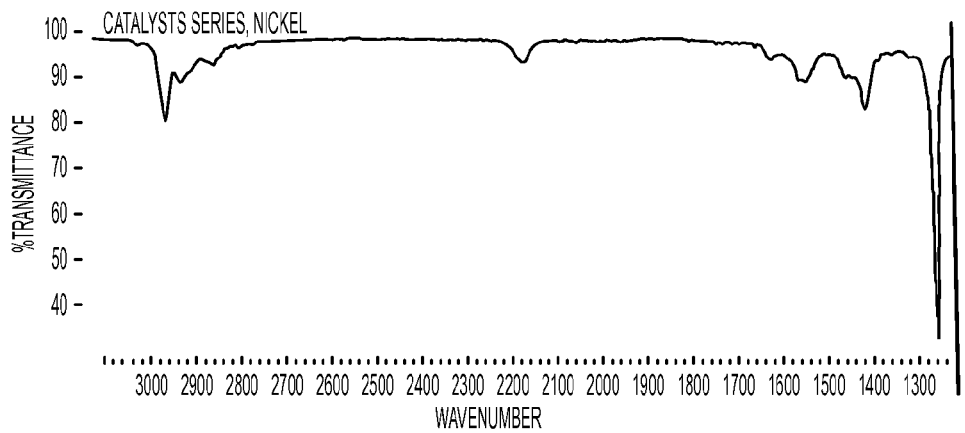
FIGS. 4-6 demonstrate the aging of the liquid formulations for silicone release liners in the presence of nickel ("Ni") catalysts. In this case, nickel (II) octanoate, as further discussed below, was used.
Figure 5:
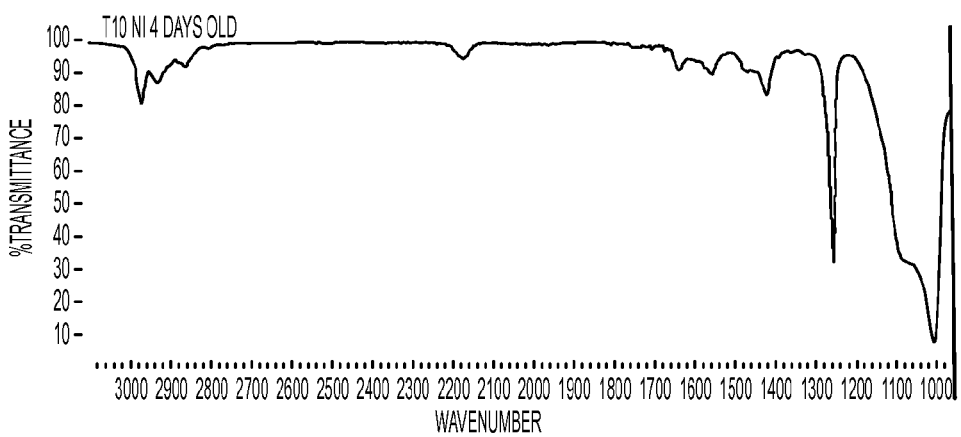
Figure 6:
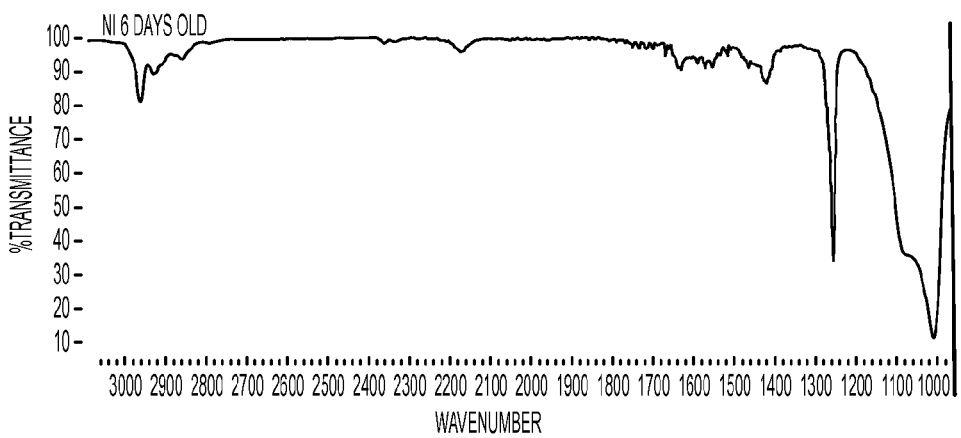
Figure 7:
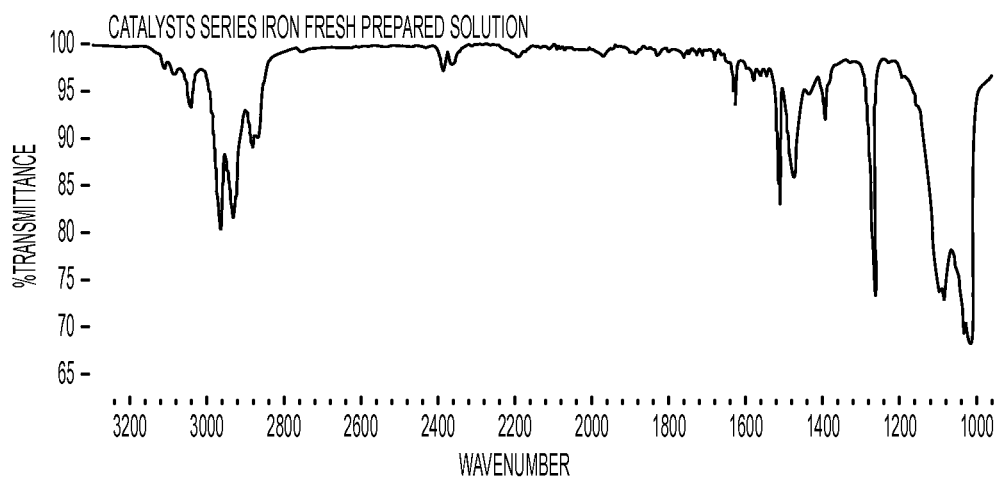
FIGS. 7-8 demonstrate the aging of the liquid formulations for silicone release liners in the presence of iron ("Fe") catalysts. In this case, iron acetate, as further discussed below, was used.
Figure 8:
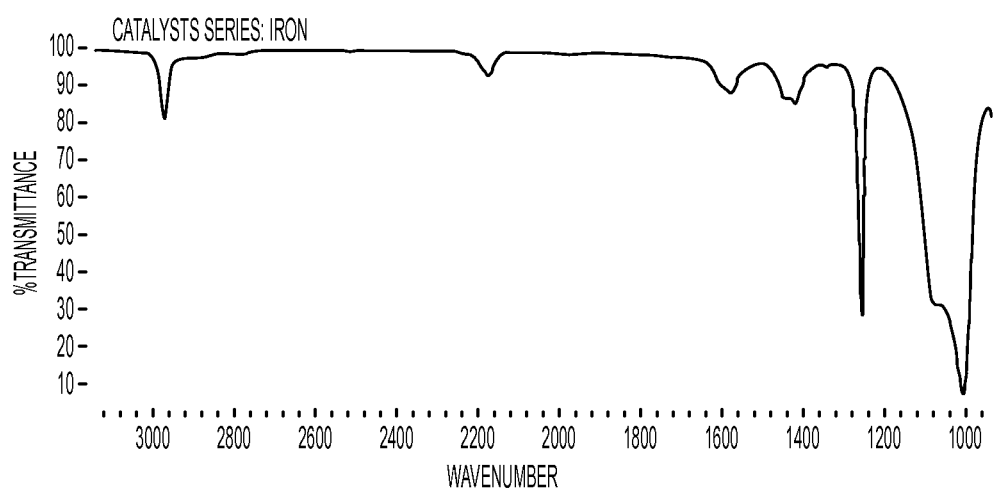
Figure 9:
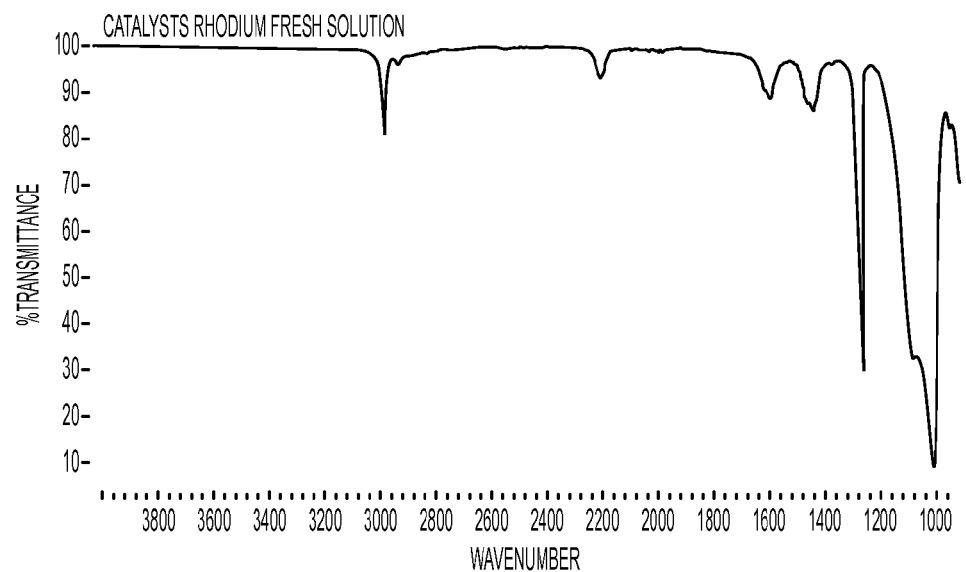
FIGS. 9-10 demonstrate the aging of the liquid formulations for silicone release liners in the presence of rhodium ("Rh") catalysts. In this case, rhodium octanoate dimer, as further discussed below, was used.
Figure 10:
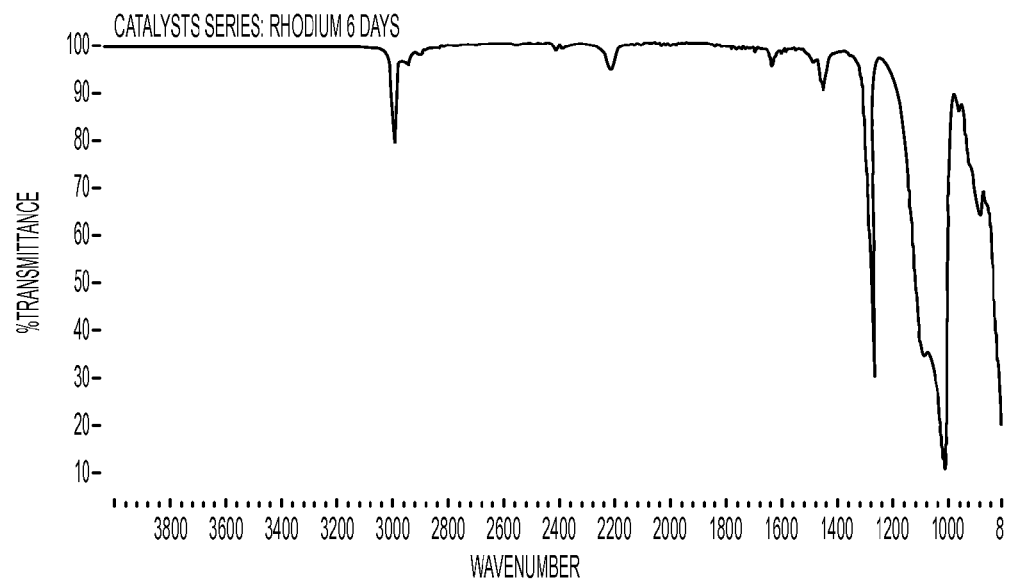

FIGS. 4-6 show spectra taken at the same time frame with the same release coating formulation as in FIGS. 1-3, but with a nickel ("Ni") catalyst. FIGS. 7-10 show spectra taken promptly after preparation and after 6 days of storage at room temperature with the same release coating formulation as in FIGS. 1-3, but with an iron ("Fe") catalyst (FIGS. 7-8) and a rhodium ("Rh") catalyst (FIGS. 9-10) rather than a bismuth ("Bi") catalyst. These Figures demonstrate a very low consumption of Si—H, leading to the conclusion that catalysts having nickel, iron, and rhodium compounds are poor catalysts for silicone crosslinking. Specifically, the films prepared with nickel, iron, and rhodium compounds as the catalysts (at equivalent elemental metal atomic concentrations of tin ("Sn") catalyst) had smudgy surfaces, leaving one's fingerprint on a surface when rubbed or smudged. Specifically, a finger pushed against the surface removed material in the form of an unset viscous liquid as opposed to scuffing a delicate solid. This indicated that the films had not cured showing the relevance of the spectral peak's presence. This leads to the conclusion that the silicone release coatings that utilized these catalysts were not sufficiently cured.

In contrast, films prepared with tin ("Sn") and bismuth ("Bi") catalysts under the same process conditions had glossy surfaces, were cured sufficiently, and exhibited the same mechanical and release properties. Given that other catalysts with a structure similar to tin carboxylates did not cure the silicone release agents, it was surprising and unexpected that bismuth ("Bi")-catalyzed silicone release agents cured at the same or lower concentrations and under the same conditions as tin ("Sn")-catalyzed coatings and had the same mechanical and release properties.

Another unexpected advantage of using bismuth ("Bi")-catalyzed silicone release coatings compared with the traditional tin ("Sn")-catalyzed silicone release coatings is a reduction in orange peel distortion in the adhesive bonded to the release liner.

Silicone release liners consisting of a silicone coated PET film are often used to protect optically clear pressure sensitive adhesives. Such adhesives might be used in solar control films or electronic displays, for example, where distortion-free transparency of the adhesive is paramount. One form of distortion very common in this type of adhesive is orange peel distortion, so called because of its appearance reminiscent to that of the surface of an orange when viewing the adhesive layer at an angle. Excessive orange peel distortion renders the coated adhesive unusable because of poor visual (or optical) quality in the end-use product such as solar control film.

Orange peel distortion appears to come into play when rolls of laminate utilizing silicone release liners are formed which are wound particularly tight and may be caused by pressure on the film, slippage of component parts relative to each other, or other effects or combinations of effects. However, orange peel distortion generally is worse closer to the core of a large roll of laminate (as it would have more tension and/or pressure on the laminate closer to the core) one examines, and the longer that the laminate is maintained on the roll instead of in smaller rolls.

Because the deleterious effects of orange peel distortion are ultimately seen by eye, adhesive-coated transparent film products are generally inspected by eye after manufacture using a visual grading scale. One such scale ranges from 0 to 5 where an adhesive coating of grade 0 has no discernible orange peel distortion while one of grade 5 might have very bad orange peel distortion. A pass-fail grade is set within the scale, for example grades 0 to 3 pass and 4 to 5 fail quality inspection and require reworking or disposal. With training and experience and aided by reference samples, individuals can assess a particular film sample accurately and reproducibly.

Proper comparisons of orange peel distortion in two film samples can only be made if adhesive coating and lamination of the release liner is carried out on a roll-to-roll coating machine rather than preparing sheet samples in the laboratory. Two release liners were made with silicone coatings according to the formulations of Sample 1 in Table 1 (below), using dibutyltin diacetate catalyst, and Sample 4 in Table 3 (below), using the BICAT® 8 catalyst. These release liners were then laminated to identical rolls of pressure-sensitive adhesive coated PET film. The adhesive was a typical solvent-based polyacrylate pressure sensitive adhesive manufactured by, for example, Henkel Corporation. Samples were taken from 5000 ft rolls of laminate at different times and positions through the rolls and assessed for orange peel distortion visually and with tests across both the machine direction (MD—the direction that the material is wound) and the transverse direction (TD—the direction perpendicular to the direction the material is wound) which sometimes show slightly different effects.

Figure 11:
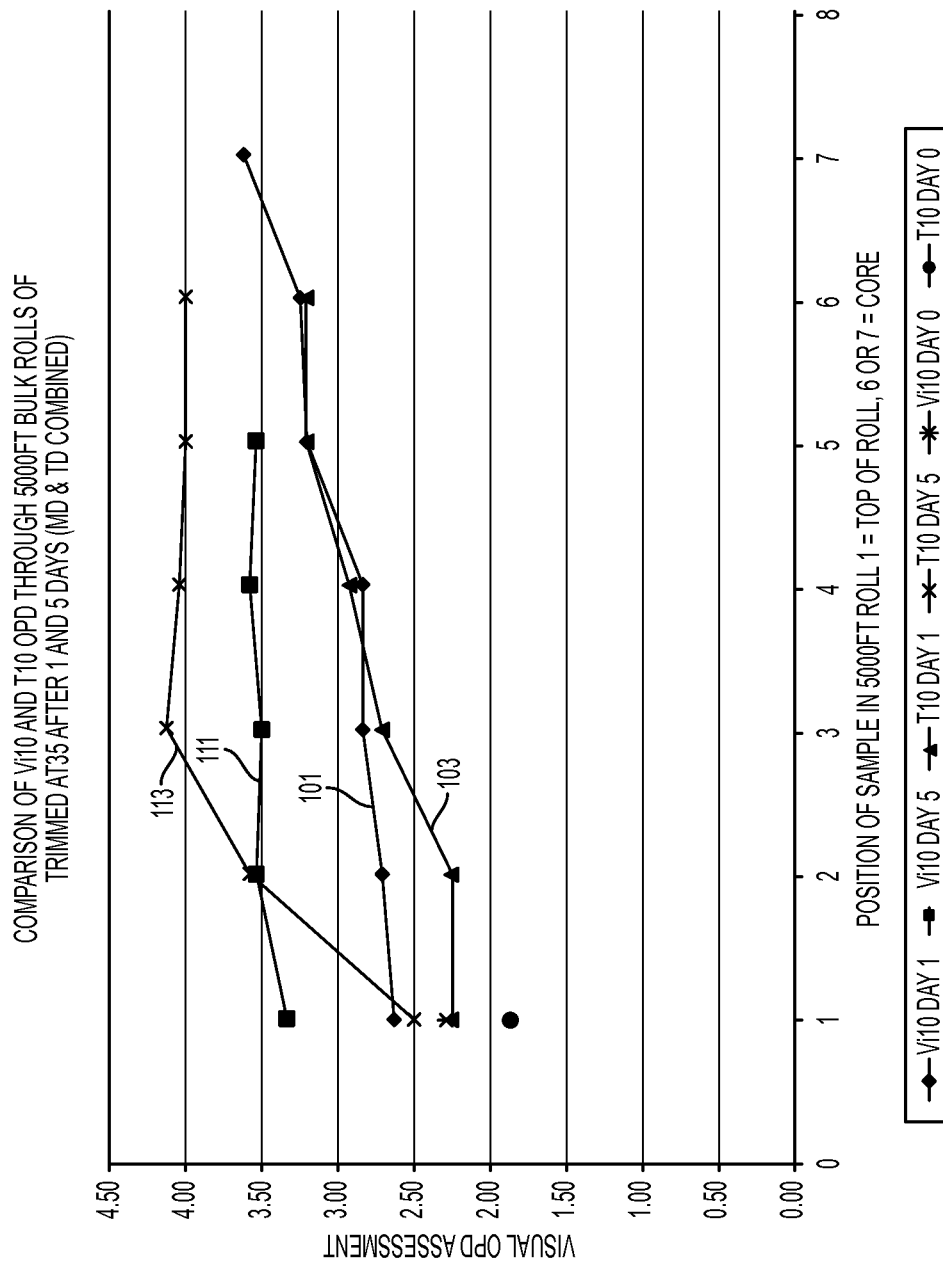
FIG. 11 shows a comparison of average detected orange peel (averaged across both the machine direction (MD) and transverse direction (TD)) of sample of bismuth ("Bi") catalysts and a tin ("Sn") catalyst.

FIG. 11 shows that laminates made from both tin ("Sn")- and bismuth ("Bi")-catalyzed silicone release liners exhibit orange peel distortion measured visually that generally increases with time and depth into the roll of film that the samples were taken from (i.e., increases as the samples get closer to the core). However, as can be seen, while the bismuth ("Bi")-catalyzed liner showed a greater in distortion after 1 day (line (101)) compared to the tin ("Sn")-catalyzed liner (line (103)), the bismuth ("Bi")-catalyzed liner showed a lower level of orange peel distortion after 5 days (line (111)) than the tin ("Sn")-catalyzed liner (line (113)). Furthermore, the bismuth ("Bi")-catalyzed liner is associated with a laminate in which orange peel distortion is more stable both over time and through the roll of laminate as the lines (101) to (111) do not shift upward as much as the lines (103) and (113) and are flatter throughout the roll. This shows a laminate that appears to be significantly more stable over time.

It is differences in the level of orange peel distortion at these longer times that is most commercially significant. Rolls of laminate made in 1000 foot, 2000 foot, 5000 foot, 10000 foot, or longer 'bulk' rolls, for example, are generally cut down into smaller rolls, such as 100 foot rolls, for sale. The quicker distortion develops, which often increases as the bulk roll gets bigger, the quicker these smaller sale-size rolls must be created (that is, the quicker the bulk rolls must be cut down into smaller rolls and not stored as bulk rolls). In most prior cases, if sale-size rolls were not created within about one or two days of making a 'bulk' roll, the laminate could become so distorted as to render a good portion, if not all the bulk roll, unusable due to the orange peel distortion. It has been shown that once sale-size rolls (e.g. 100 foot) are created, the laminate is stabilized and the amount of distortion does not significantly increase over time. This inability to keep bulk rolls longer than about 2 days due to the distortion severely reducing manufacturing flexibility and ultimately removes the option of supplying 'bulk' rolls to the marketplace or storing certain laminates in bulk form until needed. Instead, additional warehousing is required to store large numbers of smaller sale-size rolls and transportation, packaging and handling costs are increased as material must be shipped after being cut into smaller rolls, which take up more space than one large roll.

For these reasons, the difference in FIG. 11 between the behavior of the tin ("Sn")-catalyzed and the bismuth ("Bi")-catalyzed release liners after five days is most significant. The ability to maintain a bulk roll for any additional period of time provides for flexibility in storage and transportation. A bulk roll which previously would be unusable or unsalable after two days can now be stored for five days (thus allowing the roll to be stored longer), and more importantly, allowing for the roll to be shipped a greater distance prior to it needing to be broken down into smaller, sale-sized rolls.

The bismuth ("Bi") catalysts and the bismuth ("Bi")-catalyzed coatings disclosed herein while particularly discussed in conjunction with silicone release liners can also be useful for other silicone end-use applications, such as other silicone polymers, including room temperature vulcanizable (RTV) silicone elastomers and sealants that currently use tin catalysts such as stannous octoate or dibutyltin dilaurate.

The presently described composition and associated coatings will now be described with reference to the following non-limiting examples. However, before turning to the examples, it is useful to have an understanding of the tests by which some of the properties and characteristics of the coatings are measured.

As noted above, peel release value (PRV) of the cured coating is the force required to peel an adhesive from a release liner and is traditionally measured in g-force/in. A test tape (3M 610 tape or Toray's Tesa® 7475) of approximately ten (10) inches is applied with a 4.5 pound calibrated hand rubber roller to a five-day old cured release liner coating. After one (1) hour, the tape is peeled from the release liner coating at a rate of 90 inches per minute and a peel height (height of the mechanical arm gripping the tape) of 1.75 inches. The measurements of PRV are then performed with a peel tester such as the IMASS SP-2000 or 2100 of IMASS, Inc. The release liners disclosed herein resulted in a PRV of 3 to 300 g-force/in.

The coating performance of the release liners can be tested and described in a variety of ways and based on different valuations. In a first test (named the Smudge Test herein) a finger is rubbed over the release liner coating, and then, the coating is observed to see whether there is a smear or smudge on the coating. Second, the "Extraction Percentage" of the cured coatings can be determined. A square piece of release liner with a cured coating of dimensions 5"×5" is submerged into 200 mL of hexane for 30 min. The thickness of coating is measured (by X-ray fluorescence spectrometry of elemental Si with a proper parameterization of the fluorometer) both before and after the liner is submerged in the hexane. It is preferred that the coating decreases in thickness by no more than 15% as a result of extraction. Third, the "readhesion test" can measure the coating performance of the release liner with respect to transfer of silicone to the adhesive surface. A test tape is applied to stainless steel (6" length) and the $PRV_0$ is measured. A fresh piece of tape is then applied to the cured coatings and removed. The same piece of tape (that was applied to the cured coating) is applied to a clean stainless steel surface the same way and the $PRV_1$ is measured. In a preferred embodiment, the $PRV_1$ is at least 85% of $PRV_0$, meaning that little silicone coating has been transferred to the adhesive tape surface (or that most of the coating remained on the liner). In other words, the coating is robust in that the degree of contamination of the tape by the coating is small. Finally, the "Si—H IR Disappearance" can be measured. The IR spectra of the release liner composition is measured which demonstrates the aging of a liquid silicone formulation. More specifically, the Si—H vibrations of silane curing agent can result in a spectral absorption band at 2160 $cm^{-1}$ which is indicative that the silicone coating has not cured (as discussed above). However, the disappearance of this absorption band is a strong indication that curing has occurred. The cured coatings disclosed herein demonstrate the complete disappearance of a relatively weak but measurable absorption band at 2160 $cm^{-1}$ in ATR IR spectrum of the cured coating.

Examples 1-3

Coating solution with tin ("Sn") catalysts were first prepared as comparative examples. Varying amounts of solvent (toluene and heptane); silanol (SS4191A); silane (SS4191B); amino silane (SS4259C); control release additive ("CRA") (MQ resin, SS4215); all of which are available from Momentive™ Performance Materials and the catalyst (dibutyltin diacetate) were all mixed together to form the compositions shown below in Table 1. The values given are masses based on a total solution of about 200 grams. The molecular weight of these components varies from batch to batch but is approximately 500, 4.5, 2, and 4 kg/mol, respectively, for the silanol, CRA, silane, and amino silicone.

TABLE 1

| Components | Sample 1 | Sample 2 | Sample 3 |
| --- | --- | --- | --- |
| Toluene | 58.5 | 48.5 | 52.1 |
| Heptane | 101.1 | 98.4 | 89.2 |
| Silanol | 36.7 | 37.4 | 32.9 |
| Silane | 0.6 | 0.5 | 0.5 |
| Amino Silicone | 1.5 | 1.4 | 1.3 |
| CRA | 0.0 | 12.5 | 22.7 |
| Catalyst | 1.5 | 1.4 | 1.3 |

The compositions were applied to a PET film by a hand draw down. The liquid coatings and the PET substrate were then thermally cured in a convection oven at 300° F. for approximately 60 seconds. The resulting product was then tested according to the above described methods.

TABLE 2

| Test | Sample 1 | Sample 2 | Sample 3 |
| --- | --- | --- | --- |
| Smudgy | No | Some | Some |
| Thickness, nm | 110 | 100 | 105 |
| Extraction | 14% | 11% | 12% |
| PRV, g-force/in (610 tape) | 9 | 34 | 51 |
| PRV Readhesion | 88% | 93% | 91% |
| Si—H IR Disappearance | Complete | Complete | Complete |

As can be seen, the addition of the CRA leads to an increase of PRV. The CRA also improves the adhesion of the silicone release liner to the PET. However, the tin ("Sn") catalyst in the presence of the CRA did result in some smudginess in the liner.

Examples 4-6

Varying amounts of solvent (toluene and heptane); silanol (SS4191A); silane (SS4191B); amino silane (SS4259C);

control release additive (MQ resin—SS4215); and catalyst (bismuth-zinc neodecanoate mixture with about 8 wt % bismuth) were all mixed together to form the compositions shown below in Table 3. The values given are masses based on a total solution of about 200 grams. The molecular weight of these components varies from batch to batch but is approximately 500, 4.5, 2, and 4 kg/mol, respectively, for the silanol, CRA, silane, and amino silicone.

TABLE 3

| Components | Sample 4 | Sample 5 | Sample 6 |
| --- | --- | --- | --- |
| Toluene | 58.5 | 48.5 | 52.1 |
| Heptane | 101.1 | 98.4 | 89.2 |
| Silanol | 36.7 | 37.4 | 32.9 |
| Silane | 0.6 | 0.5 | 0.5 |
| Amino Silicone | 1.5 | 1.4 | 1.3 |
| CRA | 0.0 | 12.5 | 22.7 |
| Catalyst | 1.1 | 1.1 | 1.0 |

The compositions were applied to a PET film by a hand draw down. The liquid coatings and the PET substrate were then thermally cured in a convection oven at 300° F. for approximately 60 seconds. The resulting product was then tested according to the above described methods.

TABLE 4

| Test | Sample 4 | Sample 5 | Sample 6 |
| --- | --- | --- | --- |
| Smudgy | No | No | No |
| Thickness, nm | 95 | 115 | 100 |
| Extraction | 12% | 11% | 10% |
| PRV, g-force/in (610 tape) | 10 | 35 | 58 |
| PRV Readhesion | 87% | 90% | 93% |
| Si—H IR Disappearance | Complete | Complete | Complete |

As can be seen from a comparison of Tables 2 and 4, the formulation of bismuth ("Bi") catalyst (i.e., bismuth-zinc neodecanoate mixture with about 8 wt % bismuth) leads to similar properties as tin ("Sn")-catalyzed formulations. In fact, the bismuth ("Bi") catalyst is four times more efficient (on an elemental metal basis) than a conventional tin ("Sn") catalyst on a mole-to-mole basis. Additionally, bismuth ("Bi")-catalyzed formulations produced the same inherent performance properties of release liners as systems that were tin ("Sn")-catalyzed. As such, a release liner with the same properties can be obtained if about a quarter of the amount on a molar basis of the bismuth ("Bi") catalyst (such as BiCAT® 8 bismuth/zinc) is used in place of a traditional tin ("Sn") catalyst in the same coating formulation.

Examples 7-9

Varying amounts of solvent (toluene and heptane); silanol (SS4191A); silane (SS4191B); amino silane (SS4259C); control release additive (MQ resin—SS4215); and catalyst (bismuth neodecanoate mixture with low concentration of acid and about 28 wt % bismuth) were all mixed together to form the compositions shown below in Table 5. The values given are masses based on a total solution of about 200 grams. The molecular weight of these components varies from batch to batch but is approximately 500, 4.5, 2, and 4 kg/mol, respectively, for the silanol, CRA, silane, and amino silicone.

TABLE 5

| Components | Sample 7 | Sample 8 | Sample 9 |
| --- | --- | --- | --- |
| Toluene | 58.5 | 48.5 | 52.1 |
| Heptane | 101.1 | 98.4 | 89.2 |
| Silanol | 36.7 | 37.4 | 32.9 |
| Silane | 0.6 | 0.5 | 0.5 |
| Amino Silicone | 1.5 | 1.4 | 1.3 |
| CRA | 0.0 | 12.5 | 22.7 |
| Catalyst | 1.1 | 1.1 | 1.0 |

The compositions were applied to a PET film by a hand draw down. The liquid coatings and the PET substrate were then thermally cured in a convection oven at 300° F. for approximately 60 seconds. The resulting product was then tested according to the above described methods.

TABLE 6

| Test | Sample 7 | Sample 8 | Sample 9 |
| --- | --- | --- | --- |
| Smudgy | Some | No | No |
| Thickness, nm | 110 | 105 | 120 |
| Extraction | 12% | 13% | 14% |
| PRV, g-force/in (610 tape) | 9 | 40 | 62 |
| PRV Readhesion | 86% | 92% | 94% |
| Si—H IR Disappearance | Complete | Complete | Complete |

As can be seen from a comparison of Tables 2 and 6, the formulation with a different bismuth ("Bi") catalyst (i.e., bismuth neodecanoate mixture with low concentration of acid and about 28 wt % bismuth) leads to quite similar properties as the tin ("Sn")-catalyzed formulation, as well as with other bismuth ("Bi") catalysts.

Example 10

Solvent (toluene and heptane); silanol (SS4191A); silane (SS4191B); amino silane (SS4259C); and catalyst (bismuth carboxylate with no extra acid and about 28 wt % bismuth) were all mixed together to form the composition shown below in Table 7. The values given are mass percentages based on a total solution of about 200 grams. The molecular weight of these components varies from batch to batch but is approximately 500, 4.5, 2, and 4 kg/mol, respectively, for the silanol, silane, and amino silicone.

TABLE 7

| Components | Sample 10 |
| --- | --- |
| Toluene | 58.5 |
| Heptane | 101.1 |
| Silanol | 36.7 |
| Silane | 0.6 |
| Amino Silicone | 1.5 |
| CRA | 0.0 |
| Catalyst | 1.1 |

The composition was applied to a PET film by a hand draw-down. The liquid coating and the PET substrate were then thermally cured in a convection oven at 300° F. for approximately 60 seconds. The resulting product was then tested according to the above described methods.

TABLE 8

| Test | Sample 10 |
| --- | --- |
| Smudgy | No |
| Thickness, nm | 95 |
| Extraction | 13% |
| PRV, g-force/in (610 tape) | 7 |
| PRV Readhesion | 90% |
| Si—H IR Disappearance | Complete |

As can be seen from a comparison of Tables 2 and 8, the formulation with yet another bismuth ("Bi") catalyst (i.e., bismuth carboxylate with no extra acid and about 28 wt % bismuth) leads to similar properties as tin ("Sn")-catalyzed formulations as well as formulations with different bismuth ("Bi") catalysts.

While the inventions have been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of any invention herein disclosed.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A method of forming a silicone release coating, which comprises reacting a hydroxyl-terminated polysiloxane, silanol prepolymer, or mixture thereof with silane crosslinking agent having a Si—H functionality of at least 2 in the presence of a bismuth catalyst to form a crosslinked polysiloxane and dihydrogen; wherein the silane crosslinking agent has a lower molecular weight than the polysiloxane, silanol prepolymer, or mixture thereof; and wherein the bismuth catalyst is used in an amount of about 2 to 14 wt % based on the weight of the hydroxyl-terminated polysiloxane, silanol prepolymer, or mixture thereof in the coating formulation, wherein the bismuth catalyst comprises bismuth-zinc neodecanoate.

2. The method of claim 1 wherein the hydroxyl-terminated polysiloxane comprises a hydroxyl-terminated polydimethylsiloxane and the silanol prepolymer comprises an α,ω-dihydroxysilanol of polydimethylsiloxane, a diphenylsiloxane backbone, or a methylphenylsiloxane backbone.

3. The method of claim 1 further comprising adding an amino silicone to the reaction.

4. The method of claim 1 further comprising adding a control release additive to the reaction.

5. The method of claim 4 wherein said control release additive comprises a silicone resin of the general formula $R_nSiO_{(4-n)/2}$ where n is 0 to 4 and where R is a hydrocarbon.

6. The method of claim 1 wherein the bismuth catalyst comprises at least 8 weight percent bismuth based on the total weight of the catalyst.

7. The method of claim 1, wherein the bismuth catalyst comprises between 8 and 31 weight percent bismuth, based on the total weight of the catalyst.

8. The method of claim 1, wherein the bismuth catalyst comprises not more than 20 weight percent bismuth, based on the total weight of the catalyst.

9. The method of claim 1, wherein the bismuth catalyst does not include tin.

10. A method of forming a silicone release coating, the method comprising: reacting a hydroxyl-terminated polysiloxane, silanol prepolymer, or mixture thereof with a silane crosslinking agent having a Si—H functionality of at least 2 in the presence of a bismuth catalyst to form a crosslinked polysiloxane and dihydrogen, wherein the silane crosslinking agent has a lower molecular weight than the polysiloxane, silanol prepolymer, or mixture thereof, and wherein the bismuth catalyst comprises bismuth zinc neodecanoate and does not include tin.

11. The method of claim 10, wherein the bismuth catalyst further comprises at least one metal selected from the group consisting of zinc, zirconium, palladium, aluminum, and combinations thereof.

12. The method of claim 1, wherein the bismuth catalyst further comprises a bismuth catalyst selected from the group consisting of a bismuth 2-ethylhexanoate, a metal carboxylate of bismuth and zinc, and combinations thereof.

13. The method of claim 10 wherein the bismuth catalyst comprises at least 8 weight percent bismuth based on the total weight of the catalyst.

14. The method of claim 10, wherein the bismuth catalyst comprises between 8 and 31 weight percent bismuth, based on the total weight of the catalyst.

15. The method of claim 10, wherein the bismuth catalyst comprises not more than 20 weight percent bismuth, based on the total weight of the catalyst.

16. The method of claim 10, wherein the hydroxyl-terminated polysiloxane comprises a hydroxyl-terminated polydimethylsiloxane and the silanol prepolymer comprises an α,ω-dihydroxysilanol of polydimethylsiloxane, a diphenylsiloxane backbone, or a methylphenylsiloxane backbone and; further comprising, adding an amino silicone and a control release additive to the reaction.

17. The method of claim 10, wherein said bismuth catalyst consists essentially of a bismuth-zinc neodecanoate.

18. The method of claim 10, further comprising adding an amino silicone to the reaction.

* * * * *